US008781317B1

(12) United States Patent
Roberts et al.

(10) Patent No.: US 8,781,317 B1

(45) Date of Patent: Jul. 15, 2014

(54) MONITORING PHASE NON-LINEARITIES IN AN OPTICAL COMMUNICATION SYSTEM

(71) Applicant: Rockstar Consortium US LP, Plano, TX (US)

(72) Inventors: Kim B. Roberts, Nepean (CA); Maurice S. O'Sullivan, Ottawa (CA); Leo L. Strawczynski, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 14/064,901

(22) Filed: Oct. 28, 2013

Related U.S. Application Data

(62) Division of application No. 10/389,804, filed on Mar. 18, 2003, now Pat. No. 8,594,499.

(51) Int. Cl.
*H04B 10/079* (2013.01)

(52) U.S. Cl.
USPC .......... 398/25

(58) Field of Classification Search
CPC .......... H04B 10/075; H04B 10/079; H04B 10/0795; H04B 10/07951; H04B 10/07953
USPC .......... 398/25, 26
See application file for complete search history.

(56) References Cited

U.S. PATENT DOCUMENTS

| | | | | |
|---|---|---|---|---|
| 4,823,360 | A | 4/1989 | Tremblay et al. | |
| 5,513,024 | A | 4/1996 | Kang | |
| 5,880,837 | A | 3/1999 | Roberts | |
| 5,896,391 | A | 4/1999 | Solheim et al. | |
| 5,949,560 | A | 9/1999 | Roberts et al. | |
| 5,999,258 | A | 12/1999 | Roberts | |
| 6,128,111 | A | 10/2000 | Roberts | |
| 6,222,652 | B1 | 4/2001 | Roberts | |
| 6,246,717 | B1 * | 6/2001 | Chen et al. | 375/226 |
| 6,252,692 | B1 | 6/2001 | Roberts | |
| 7,130,341 | B2 | 10/2006 | Haunstein et al. | |
| 2005/0078957 | A1 | 4/2005 | Hendow | |

OTHER PUBLICATIONS

Agrawal; "Nonlinear Fiber Optics"; Second Edition, 1995; Chapter 4, pp. 89-127; Chapter 5, pp. 133-141; Chapter 7, pp. 238-306.

Kato et al.; "Measurement of the nonlinear refractive index in optical fiber by the cross-phase-modulation method with depolarized pump light"; Optics Letters, vol. 20, No. 9, May 1, 1995.

Eiselt et al.; "Contribution of Timing Jitter and Amplitude Distortion to XPM System Penalty in WDM Systems"; IEEE Photonics Technology Letters, vol. 11, No. 6, Jun. 1999.

Thiele et al.; "Simple technique to determine cross-phase modulation induced penalties in WDM transmission"; OFC 2000, Mar. 7-10, 2000.

* cited by examiner

*Primary Examiner* — Shi K Li

(74) *Attorney, Agent, or Firm* — Christopher & Weisberg, P.A.

(57) ABSTRACT

Phase nonlinearities of an optical communications system are monitored by generating a test signal which includes a predetermined property that is uniquely associated with at least one phase nonlinearity of the optical communications system. The predetermined property of the test signal is then detected at a monitoring point of the optical communications system, and used to estimate the associated phase nonlinearity.

9 Claims, 6 Drawing Sheets

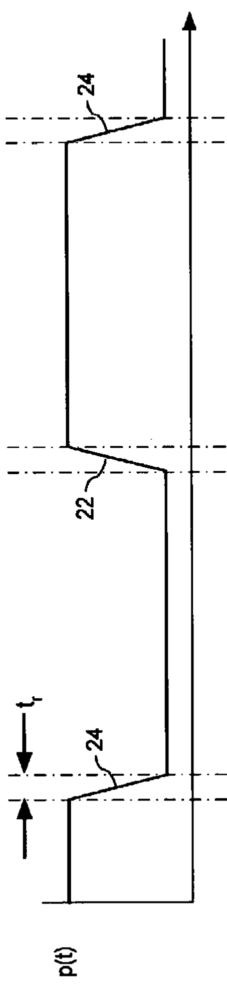
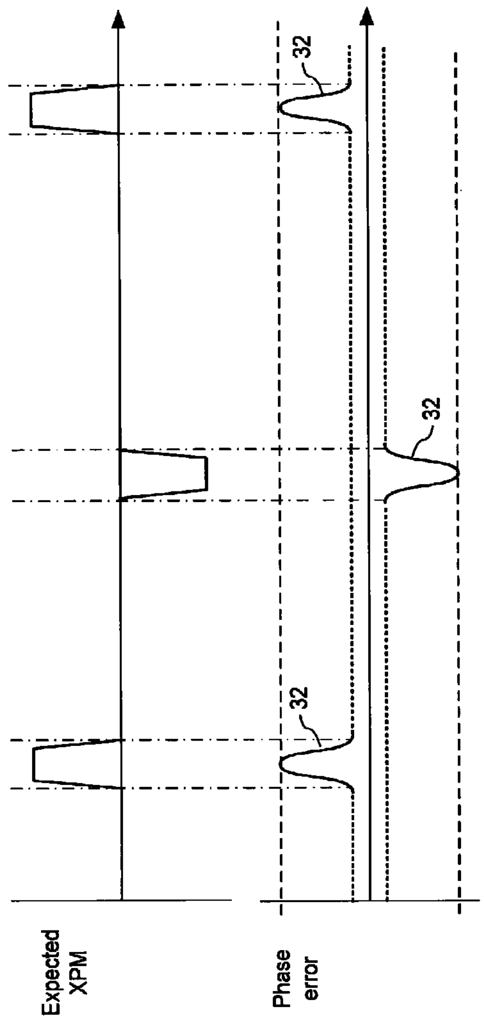
Figure 2b
Figure 2c
Figure 2d

76
From O/E
66
V+
Vopt
V-
88a
88c
88b
Local Clock
RETIME
90a
90c
90b
68
N-bit Shift Reg.
94a
94c
94b
AND
96
98
ERROR COUNT
92a
92b
82a
82b
PERFORMANCE MONITOR
80
86
Recovered data
72
SP
RAM
78
Vd 12
10
$D_{OUT}(t)$
100
O/E
102
N-bit ADC
Sample Clock
104
108
EQUALIZER
110
FEC
106
130
112
Power Detect
118
SAMPLE RAM
122
CONTROL
128
SYNC.
126
DATA RAM
120
124
116
R W
DSP
114

MONITORING PHASE NON-LINEARITIES IN AN OPTICAL COMMUNICATION SYSTEM

CROSS-REFERENCE TO RELATED APPLICATION

This application is a divisional of patent application Ser. No. 10/389,804, filed Mar. 18, 2003, entitled MONITORING PHASE NON-LINEARITIES IN AN OPTICAL COMMUNICATIONS SYSTEM, the entirety of which is incorporated herein by reference.

MICROFICHE APPENDIX n/a

TECHNICAL FIELD

The present invention relates to optical communications systems, and in particular to monitoring phase non-linearities in an optical communications system.

BACKGROUND OF THE INVENTION

In modern optical communications networks, it is generally desirable to transmit optical signals at high power levels in order to maintain sufficient signal to noise ratios over extended transmission distances, and thereby obtain an acceptably low Bit Error Rate (BER) in a received optical signal.

However, conventional optical waveguides (such as optical fibers) comprise an optical transmission medium which exhibits nonlinear effects at high optical power levels, resulting in degradation of the optical signal. Nonlinear effects may similarly occur within optical terminals of the system, in optical transmission media or in components such as optical amplifiers. The optimum power level at which optical signals can be transmitted is typically the maximum power level at which significant degradation due to nonlinearity is avoided. Since the performance of various optical components within the system varies with operating conditions, age, and component replacement, a safety margin is used in setting the maximum power level. Consequently, optical communications systems typically operate at power levels which are less than the optimum power level. A detailed discussion of nonlinear optical effects is provided by Agrawal, Govind P., "Nonlinear Fiber Optics", $2^{nd}$. Ed., Academic Press, Inc., San Diego, Calif., 1995 (ISBN 0-12-045142-5).

Of particular concern in considering nonlinear processes are the effects of phase nonlinearities, which increase as data rates and optical power levels increase, and which ultimately limit both system performance and signal reach.

Phase nonlinearities are the result of complex interactions between the optical power present in the fiber; the refractive index of the fiber medium, including the non-linear index coefficient; the wavelength division multiplexing (WDM) channel spacing; the polarization states of the signals within each of the channels; and the proximity of channel wavelengths to the zero-dispersion wavelength of the fiber. Phase nonlinearities include self-phase modulation (SPM), cross-phase modulation (XPM), and modulation-instability (MI), all of which are discussed in detail in Agrawal (supra), at chapters 4 and 7.

Self-phase modulation (SPM) is a by-product of the relationship between the refractive index of the fiber medium and the optical power present in the fiber. In particular, changing optical power causes a change in the refractive index of the fiber medium. The refractive index change is proportional to the optical power level. Changing the refractive index produces a Doppler-like frequency shift (or chirp) that is proportional to the time-rate of change of the refractive index (and, equivalently, the optical power level). Thus, changing optical power levels due to modulation of an optical signal causes a frequency-shift (or chirp) within the signal itself. For example, consider an isolated signal pulse (e.g., an isolated binary "1") launched into the optical fiber. SPM results in the leading edge of the pulse being red-shifted (that is, frequency shifted toward the red end of the optical spectrum), and the trailing edge of the pulse blue-shifted. Chromatic dispersion of the fiber will then cause these red- and blue-shifted portions of the pulse to propagate through the fiber at different speeds, which may result in time-domain distortion of the original pulse shape.

As may be appreciated, because the magnitude of the frequency shift is proportional to the time-rate of change of the optical power level, the amount of red- and blue-shift experienced by the pulse edges will be a function of the rise and fall times at the leading and trailing edges, and the peak power level of the pulse. In additional to these factors, the total time-domain distortion experienced by the pulse will also be affected by the nominal length of the pulse, and the length of the fiber before signal detection and regeneration. Clearly, the effects of SPM become increasingly severe as signal power, data rate (or spectral efficiency), and fiber span length are increased.

Cross-phase modulation (XPM) is similar to SPM, and produces the same frequency-shifting effects, but occurs in Wavelength Division Multiplexed (WDM) systems. XPM is always accompanied by SPM, and occurs because the effective refractive index "seen" by an optical wave propagating in the fiber medium depends not only on the intensity of that wave but also on the intensity of other co-propagating waves. Thus, refractive index changes due to rising and falling optical power levels in one channel induce corresponding frequency-domain distortions (chirps) within co-propagating signals (in adjacent channels). Chromatic dispersion of the fiber may then induce time-domain distortions of those signals, in the same manner as described above.

Modulation instability (MI) is an XPM-induced interaction between co-propagating optical waves (whether due to signal traffic, noise, or pump laser signals) within the optical fiber. This interaction produces new, unwanted wavelengths (or side-bands) that can interfere with, and/or couple power from, desired optical signals.

Nonlinear effects in an optical fiber can be measured using known optical signal and spectrum analysis equipment. Respective channels of a Wavelength Division Multiplexed (WDM) communications system can be monitored, either by multiple signal analyzers arranged in parallel, or using a single signal analyzer that is sequentially tuned to receive each optical channel signal in turn. Optical Spectrum Analyzers (OSAs) can be used to determine average and peak power levels, as a function of wavelength, across a desired range of wavelengths. Known analytical techniques can be used to determine non-linear effects from the data measured by these systems.

Due to their cost and complexity, conventional optical signal and spectrum analysis equipment is typically restricted to laboratory use. Furthermore, accurate measurement of non-linear effects using such equipment typically requires specialized test set-ups, which, again, can only be provided in a laboratory setting.

In order to monitor nonlinearities in installed optical communications systems, simpler and less expensive monitoring equipment is required. Typical (in situ) optical performance monitoring systems known in the art are disclosed in co-assigned U.S. Pat. Nos. 5,513,024; 5,949,560; 5,999,258; 6,128,111; 6,222,652; and 6,252,692. While these systems enable some degree of performance monitoring, they tend to suffer a number of disadvantages. In particular, per-channel monitoring systems are typically dependent on a low frequency pilot tone (or dither) having known parameters. Any error between the design and actual parameter values of the launched pilot tone will naturally degrade the accuracy of any performance parameters calculated at the monitoring point. Additionally, this approach assumes that performance parameters calculated on the basis of the low frequency pilot tone will be valid for the high-speed data traffic. Consequently, frequency-dependent effects (most notably phase nonlinearities) cannot be detected with this arrangement. Finally, the detectors and signal processors utilized in these monitoring systems are low frequency analog devices. This precludes their use for monitoring high-frequency phenomena such as SPM, XPM and MI.

Accordingly, a method and system that enables efficient monitoring of phase nonlinearities in an installed optical communications system remains highly desirable.

SUMMARY OF THE INVENTION

An object of the present invention is to provide a method and system for monitoring phase nonlinearities in an optical communications system.

Accordingly, an aspect of the present invention provides a method of monitoring phase nonlinearities of an optical communications system. According to the present invention, a test signal is generated, which includes a predetermined property that is uniquely associated with at least one phase nonlinearity of the optical communications system. The predetermined property of the test signal is then detected at a monitoring point of the optical communications system.

In some embodiments, the test signal is generated by simultaneously transmitting probe and data signals through respective channels of the optical communications system. In this case, the probe signal has an arbitrary frequency, but has a rise and fall time that is selected to emulate that of live data traffic. This arrangement produces a test signal, at the receiving end of the optical communications system, which comprises the data signal and a distortion component in the form of frequency chirps that are uniquely associated with cross-phase modulation (XPM) between the probe and data signal channels. The frequency chirps in the test signal can be measured by a conventional clock-recovery circuit, and isolated (from other frequency-domain noise) by correlation with rising and falling edges of the probe signal. Accuracy of this correlation function can be improved by prefiltering the received probe signal prior to the correlation.

In other embodiments, the test signal is generated by imposing a selected dispersion to a data signal received through a selected channel of the optical communications system. For "flat portions" of the test signal, the variation in signal noise (e.g. as represented by bit error rate) with changes in the imposed dispersion can be readily evaluated, and is uniquely associated with non-linearity in the optical communications system.

In further embodiments of the present invention, a respective high-speed analog-to digital detector is used to sample each channel of the optical communications system. The sample data is stored in association with the corresponding recovered data generated by conventional data recovery circuits. In this case, the test signal comprises an isolated signal pulse within the recovered data. A digital signal processor (DSP) can then analyze the associated sample data to determine the corresponding signal waveform. Changes in the signal wave form with changing transmission power level of the involved channel provides a direct measure of self-phase modulation (SPM). Correlation between simultaneously stored sample data of adjacent channels provides a direct measure of cross-channel effects, such as XPM and cross-talk. If desired, a probe signal as described above, can be used to simplify the correlation algorithm implemented in the DSP for evaluating XPM.

BRIEF DESCRIPTION OF THE DRAWINGS

Further features and advantages of the present invention will become apparent from the following detailed description, taken in combination with the appended drawings, in which:

FIGS. 2*a*-2*d* schematically illustrate principal elements and operations of a monitoring system in accordance with a first embodiment of the present invention;

It will be noted that throughout the appended drawings, like features are identified by like reference numerals.

DETAILED DESCRIPTION OF THE PREFERRED EMBODIMENT

Figure 1:
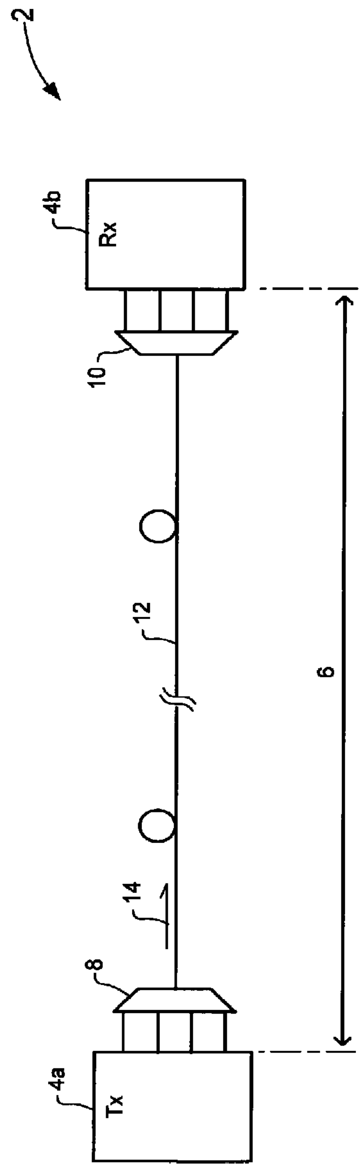
FIG. 1 is a block diagram schematically illustrating principal elements of an optical communications network in which the present invention may be deployed.

The present invention provides a method and system for monitoring phase nonlinearities, such as self-phase modulation (SPM), cross-phase modulation (XPM), and modulation-instability (MI) in an optical transmission system. In general, a test signal having a predetermined property that is uniquely associated with at least one type of phase nonlinearity is generated. The predetermined property of the test signal is detected at a selected monitoring point of the optical communications system. For the purpose of the present description, the monitoring point is located at a receiving node of an optical communications link. However, it will be appreciated that the monitoring point may be at any desired location capable of receiving WDM signal traffic. The magnitude of the phase nonlinearity is then evaluated from the detected value of the predetermined property. FIG. 1 is a block diagram schematically illustrating principal elements of an exemplary optical communications system in which the present invention may be deployed.

As shown in FIG. 1, the optical communications system 2 comprises a pair of network nodes 4*a* and 4*b* interconnected by a link 6. The network nodes 4 may be any discrete electro-optical network devices (such as, for example, routers, add-drop multiplexers, etc.) known in the art. Similarly, the link 6 may be provided as a cascade of interconnected optical components (e.g., optical amplifiers interconnected by optical fiber spans) in a manner well known in the art. For the purposes of description of the present invention, the link 6 comprises an optical multiplexer 8, and an optical de-multiplexer 10, which are interconnected by a single optical fiber span 12. However, it will be understood that the present invention is not limited to such embodiment.

In general, traffic in the optical communications system 2 may be bi-directional. However, in order to simplify description of the invention, data traffic within the link 6 will be considered to be uni-directional, being launched through the link 6 by sending node 4*a*, and propagating in a so-called "forward" direction 14 through the link 6 to the receiving node 4*b*.

Figure 2A:
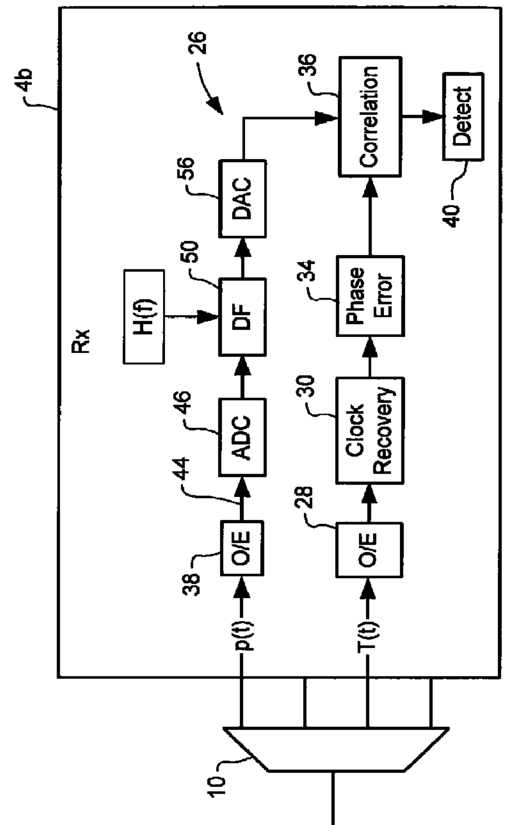
Figure 2A:
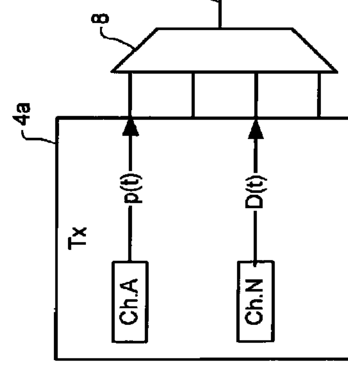

FIGS. 2*a*-2*d* schematically illustrate principal elements and operations of a monitoring system in accordance with a first embodiment of the present invention. The embodiment of FIG. 2 is particularly suited for monitoring cross phase modulation (XPM) between a pair of channels. In the illustrated example, XPM is monitored between a first channel, which is nominally designated as channel A, and a second channel, nominally designated as Channel N. Thus a probe signal p(t) is transmitted through channel A using carrier wavelength 4, while a data signal D(t) is simultaneously transmitted through channel N using carrier wavelength 4T. As the two signals co-propagate through the link 6, XPM between channels A and N generates a test signal T(t) which is received, by the receiving node 4*b*, through channel N.

As is known in the art, XPM within the link 6 can be mathematically modeled (at least to a linear approximation) by means of a "transfer" function H(f); where the term (f) refers to the frequency variable across the base-band modulation spectrum. With this formulation, the XPM-induced components in the test signal T(t), due to the presence of the co-propagating probe signal p(t) can be approximated as $XPM(f)=H(f)\cdot P(f)$, where P(f) is the Fourier Transform of the probe signal p(t). In a simple example, the transfer function H(f) can be defined as a time derivative, which models the effect of changing optical power level on refractive index, and thus frequency shift. Additional terms can be added to the transfer function H(f), in order to model the effects of dispersion, namely; time domain signal distortions due to the differing propagation speeds of chirped portions of that signal, and "signal walk-off" due to differing propagation speeds of signals in different channels. It should be noted that the use of a transfer function H(f) an a mathematical approximation of the XPM effect is known in the art, and thus will not be described in further detail herein.

Preferably, the data signal D(t) transmitted though channel N comprises live subscriber data traffic. This is advantageous in that use of live traffic in the monitoring process reduces costs, and minimizes service disruptions during the monitoring process. If desired, however, a "test data" signal designed to emulate live data traffic can be used. For example, the "test data" signal may be designed as a pseudo-random bit sequence having a bit rate corresponding to the line rate of channel N.

The probe signal p(t) is preferably designed to generate XPM distortion components in the test signal T(t) that are similar in magnitude to those that would be generated by live data traffic in channel A. In principle, live data traffic can be used as the probe signal p(t). However, in this case, the probe signal p(t) would need to be measured at the receiving node 4*b* in order to isolate XPM from other distortion effects. Thus the probe signal p(t) is preferably a predetermined binary signal (e.g., a simple clock signal) having a known frequency and sharp rising and falling edges 22 and 24, as shown in FIG. 2*b*. Any arbitrary probe signal frequency can be used. However, in order to minimize probe signal distortions due to inter-symbol interference and/or dispersion, a comparatively low frequency (e.g., less than about 2.5 GHz) is preferable. The rising and falling edges 22 and 24 of the probe signal p(t) are selected to be as fast as those of live subscriber data traffic. With this arrangement, the probe signal p(t) will contain high-frequency components comparable to those of live subscriber data traffic, and thus XPM measured using the probe signal p(t) will provide a valid approximation of XPM when channel A contains live subscriber data traffic.

In general, the test signal T(t) arriving at the receiving node 4*b* comprises a distorted version of the original data signal D(t), including distortion components due to noise, dispersion, polarization dependent effects, and non-linear effects including XPM. The XPM-induced distortion components comprise chirped portions of the test signal T(t), which have been time-shifted due to dispersion. These XPM-induced distortion components can be correlated with the received probe signal p(t). Thus the test signal T(t) arriving at the receiving node 46 contains a known property (in the form of time-shifted chirped portions) that is uniquely associated with XPM, and can be detected by correlation with the received probe signal p(t).

Referring back to FIG. 2*a*, an XPM monitoring system 26 is located in the receiving node 4*b*, and comprises respective test and probe signal paths. The test signal path comprises an optical-to-electrical (O/E) converter 28 cascaded with a clock recovery circuit 30. As is known in the art, these elements respectively operate to convert the received test signal T(t) into a corresponding electrical test signal IT(t), and then generate a local clock signal that is frequency and phase-locked with the electrical test signal IT(t). As is also known in the art, conventional clock recovery circuits use a phase-error signal to hunt for, and maintain, phase lock between a received signal and the generated local clock signal. Because of the functional characteristics of conventional clock recovery circuits, time-shifted portions of the received test signal T(t) are carried over into the electrical test signal IT(t) and produce perturbations 32 within the phase error signal, as shown in FIG. 2*d*. Accordingly, the phase error signal generated in the conventional clock recovery circuit 30 is tapped (at 34) and supplied to a correlation circuit 36, as shown in FIG. 2*a*.

In general, the probe signal path operates to filter the received probe signal p(t), using the previously derived XPM transfer function H(f), in order to obtain an expected cross phase modulation $XPM_E$, as shown in FIG. 2*c*. As may be seen from FIGS. 2*c* and 2*d*, correlation between the expected cross phase modulation $XPM_E$ and the phase error signal enables phase error perturbations 32 corresponding to XPM induced distortion components of the test signal T(t) to be isolated. The magnitude of the isolated phase error perturbations 32 can then be detected in a conventional manner, and is directly indicative of cross-phase modulation (XPM) between the involved pair of channels.

As may be appreciated, various known methods may be employed to filter the received probe signal p(t) to obtain the expected cross phase modulation $XPM_E$. In the illustrated embodiment, the probe signal path comprises an O/E converter 38, which converts the received probe signal p(t) into a corresponding (analog) electrical probe signal 44. The electrical probe signal 44 is then supplied to a high-speed analog-to-digital converter (ADC) 46, which samples the electrical probe signal 44 at a predetermined sample rate, and generates a corresponding digital probe signal 48. The sample rate of the ADC 46 is selected to enable complete reconstruction of the original analog electrical probe signal 44. As is known in the art, this can be accomplished by selecting the sample rate to satisfy the Nyquist criterion for the electrical probe signal 44. In the present case, because it is important to fully capture the rising and falling edges 22 and 24 of the electrical probe signal 44, the sample rate is selected to satisfy Nyquist's criterion for a signal frequency that corresponds to the rise- and fall-time ($t_r$) of the probe signal 16. For example, if $t_r$ is selected to emulate 10 GHz data traffic, then the sample rate would be selected to satisfy Nyquist's criterion for a 10 GHz signal.

The digital probe signal 48 generated by the ADC 46 is then filtered by a digital filter 50 which accepts the XPM transfer function H(f) as an input. Various known digital filter types may be used to implement the digital filter 50, such as, for example, Finite Impulse Response (FIR) filters, Infinite Impulse Response (IIR) filters, and Fast Fourier Transform (FFT filters). Alternatively, the digital filter 50 may be implemented using a Random Access Memory Look-up Table (RAM LUT). In either case, the output of the digital filter 50 is the (complex) product of the received probe signal p(t) and the XPM transfer function H(f). A Digital to analog converter (DAC) 56 is coupled to the output of the digital filter 50, and operates to convert the filter output into a corresponding analog signal, which is supplied to the correlation circuit 36.

Because the XPM transfer function H(f) is a linear approximation of XPM (rather than an exact solution), and because the actual magnitude of XPM is unknown, the product of P(f) and H(f) will not exactly model actual XPM distortion components in the test signal T(t). However, it will provide a provide an expected cross phase modulation $XPM_E$ of sufficient accuracy to permit correlation with the phase error signal.

Accordingly, the phase error signal generated in the conventional clock recovery circuit is tapped (at 34) and supplied to the correlation circuit 36, as shown in FIG. 2*a*. The correlation circuit 36 also receives the expected cross phase modulation $XPM_E$ signal from the DAC 56, and operates to extract portions of the phase error signal that correspond with the expected cross phase modulation $XPM_E$. The extracted portions of the phase error signal are then supplied to a detection circuit 40, which measures the power level of the extracted portions of the phase error signal, as a direct indication of XPM between channels A and N.

In the embodiment of FIG. 2*a*, the correlation circuit 36 is an analog correlator, which receives the analog phase error and expected cross phase modulation $XPM_E$ signals. However, it will be appreciated that a digital correlator may also be used, in this case, the DAC 56 will be omitted, so that the correlation circuit 36 receives the digital output of the digital filter 50. An analog to digital converter (not shown) must also be inserted between the clock recovery circuit 30 and the correlation circuit 36 in order to convert the analog phase error signal produced by the clock recovery circuit 30 into a corresponding digital phase error signal.

A limitation of the embodiment of FIGS. 2*a*-2*c* is that the received probe signal p(t) contains distortion components, including dispersion, polarization effects, SPM and XPM from any co-propagating signals (including the data signal D(t)) within the link 6. As mentioned above, most of these distortions can be minimized (or in some cases avoided) using known techniques, such as reducing the probe signal frequency. However, in some cases, the probe signal p(t) arriving at the receiving node 4*b* may still be sufficiently distorted to interfere with accurate correlation between the expected cross phase modulation $XPM_E$ and the phase error signal. It is therefore desirable to filter the received probe signal p(t) to remove at least some of the distortion components prior to calculation of the expected cross phase modulation $XPM_E$, as is described below with reference to FIG. 3.

As may be appreciated, many techniques may suitably be used to filter remove distortions from the received probe signal p(t). In embodiments in which the probe signal p(t) is a binary clock signal having a fixed (predetermined) rise and fall time $t_r$, a conventional threshold comparator-based data regenerator circuit can be used to produce a recovered signal having the required signal shape (principally edge timing and rise and fall time). The limitation of this approach is that it cannot easily adjust to changes in the probe signal shape. For example, it may be desirable to measure XPM with a range of different rise and fall times (say, for example, at 6, 10, 14, 18 and 22 Picoseconds). A conventional threshold comparator-based data regenerator circuit detects rising and falling edges, but is generally insensitive to rise and fall times per se. Thus a conventional data regenerator circuit would fail to provide an accurate version of the original probe signal p(t) to the digital filter 50.

Figure 3:
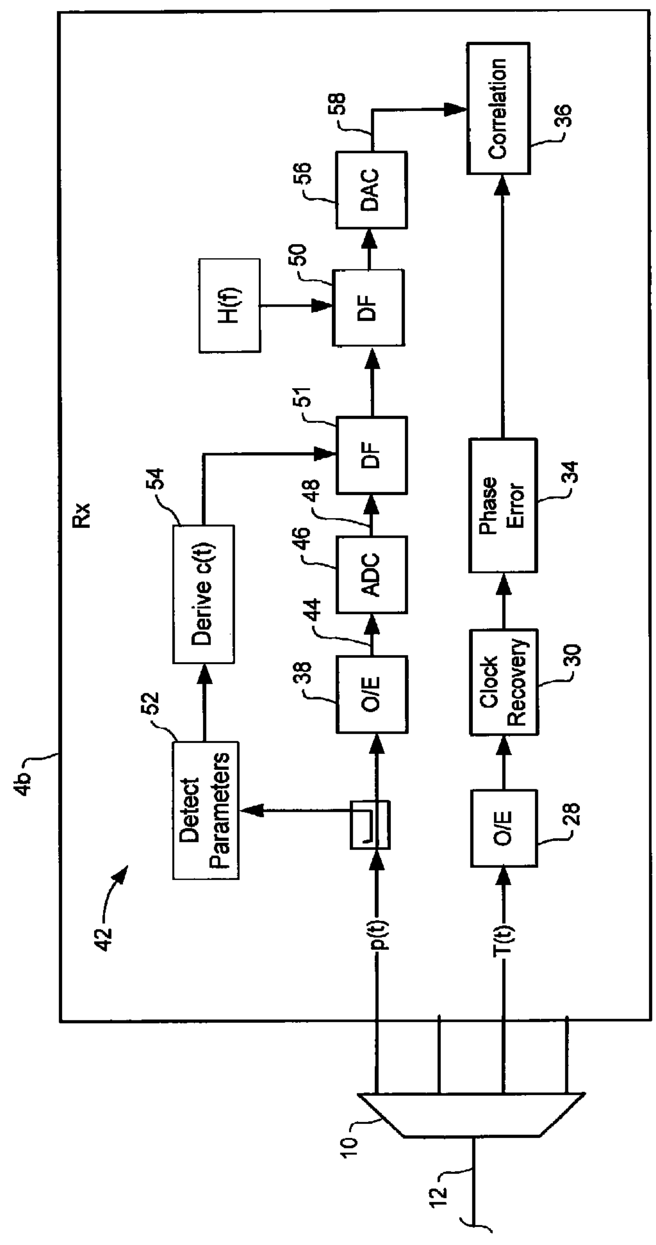
FIG. 3 is a block diagram schematically illustrating principal elements of a monitoring system in accordance with a second embodiment of the present invention.

FIG. 3 is a block diagram schematically illustrating principal elements and operations of a an embodiment of the invention which overcomes this limitation by filtering the received probe signal p(t) using a compensation filter 42 that compensates at least some of the linear distortions imposed on the probe signal p(t) by the link 6. The output of the compensation filter 42 is therefore substantially free of linear distortion effects, and automatically adjusts to changes in the shape of the original probe signal p(t).

As shown in FIG. 3, the digital probe signal 48 generated by the ADC 46 is filtered by a digital filter 51 which accepts a compensation function c(t) as an input. The compensation function c(t), is selected to compensate at least chromatic dispersion of the link 6. As with the digital filter 50, various known digital filter types may be used to implement the digital filter 50, such as, for example, Finite Impulse Response (FIR) filters, Infinite Impulse Response (IIR) filters, and Fast Fourier Transform (FFT filters). Alternatively, the digital filter 51 may be implemented using a Random Access Memory Look-up Table (RAM LUT). In either case, the output of the digital filter 50 is a replica of the received probe signal p(t), but is substantially free of the effects of chromatic dispersion.

Various methods may be used to derive the compensation function c(t). In the example of FIG. 3, the received probe signal p(t) is monitored (at 52) immediately upstream of the O/E converter 38 in order to detect signal quality parameters indicative of chromatic dispersion in channel A. In preferred embodiments, the signal quality parameters comprise a direct measurement of dispersion at the channel wavelength interest. However, other signal quality parameters (such as, for example, eye closure) may be used as a proxy for the dispersion. Any of the signal quality parameters may be detected based on an optical signal obtained by tapping the received optical probe signal, as shown in FIG. 3. A compensation function c(t) which optimizes the detected parameters can then be derived (at 54) deterministically and/or adaptively, using known techniques.

It should be noted that the functional step of deriving the compensation function c(t) can be implemented by any suitable combination of hardware and software, which may be co-located with the receiver 46 or any other location. In embodiments in which the detected parameters comprise direct measurement of dispersion, the compensation function c(t) can be calculated to minimize (and preferably eliminate)

the total dispersion. Where eye closure is used as a proxy, then the compensation function c(t) would be calculated to optimize this value.

The output of the digital filter 50 is a substantially dispersion free replica of the received probe signal p(t). This signal can then be supplied to the digital filter 50 and filtered using the previously calculated XPM transfer function H(f) to obtain the expected cross phase modulation $XPM_E$[=H(f)·P (f)]. The Digital-to-analog converter (DAC) 56 generates a corresponding analog $XPM_E$ signal 58, which is then supplied to the correlation circuit 36 and used to isolate corresponding portions of the phase error signal 34, as described above with reference to FIGS. 2*a*-2*d*. As in the embodiment of FIG. 2*a*, a digital correlation circuit 36 may also be used in the embodiment of FIG. 3, in which case the DAC 56 will be omitted, and an analog to digital converter (not shown) inserted between the clock recovery circuit 30 and the correlation circuit 36.

As described above, the embodiments of FIGS. 2 and 3 provide a direct measure of XPM in the link 6. However, it does not provide any direct information concerning self-phase modulation (SPM). One way of addressing this limitation relies on the fact that the mechanisms involved in producing both XPM and SPM are related, so that SPM can be described as a function of XPM. Consequently, for any particular optical communications system, a look-up table can be defined for estimating SPM from the detected XPM. The data used to populate the look-up table may, for example, be based on experimental data obtained during the set-up and commissioning of the optical communications system. If desired, the look-up table data may be updated, e.g., using fresh experimental data obtained during maintenance of the optical communications system to accommodate migration of the optical component performance.

Figure 4A:
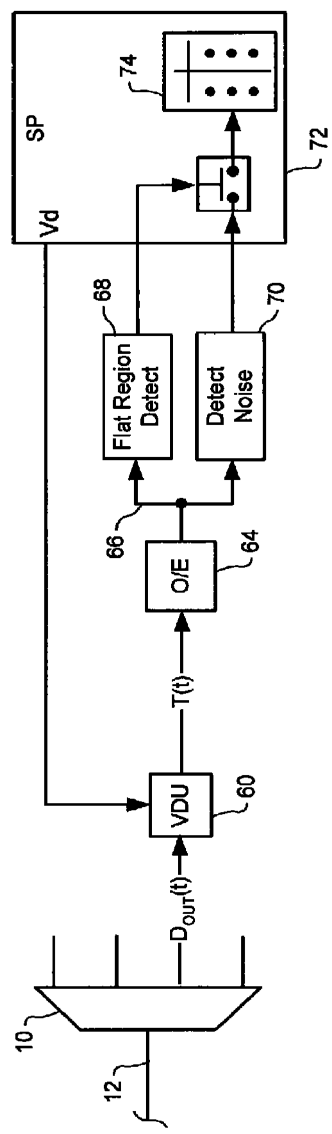
FIGS. 4*a*-4*c* schematically illustrate principal operations of a monitoring system in accordance with a third embodiment of the present invention.
Figure 4B:
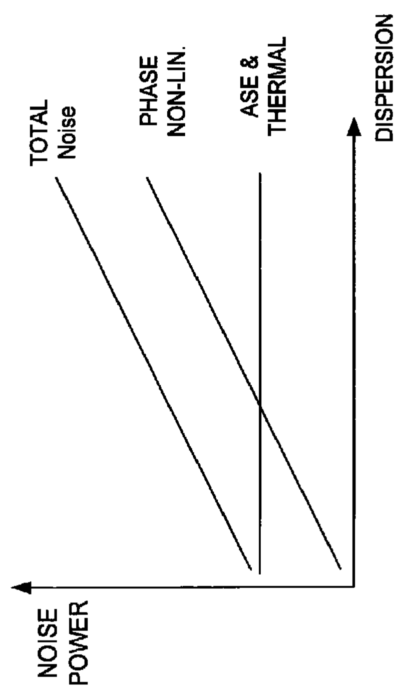
Figure 4C:
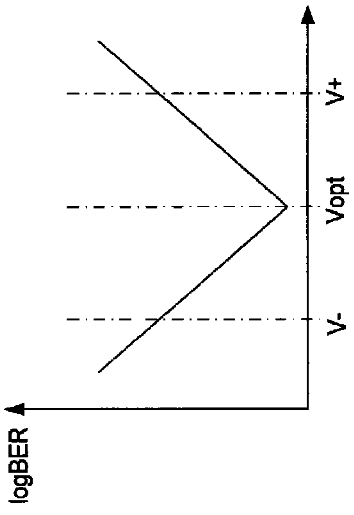

FIGS. 4*a*-4*c* schematically illustrate principal operations of a monitoring system in accordance with a third embodiment of the present invention. Operation of this embodiment is based on the fact that, apart from dispersion and polarization effects (both of which can be compensated using known techniques), the received data signal $D_{OUT}(t)$ arriving at the receiving node 4*b* through the link 6 contains noise due to intersymbol interference, ASE and Thermal noise, and phase non-linearities. Within a sufficiently long "flat region" of the received data signal $D_{OUT}(t)$ (i.e., a string of successive binary "1"s or "0"s), variance due to intersymbol interference is avoided, so that the total noise power will comprise ASE and Thermal noise, and phase non-linearities. As shown in FIG. 4*b*, the ASE and Thermal noise is substantially independent of dispersion, while phase non-linearities are strongly dispersion dependent. Accordingly, phase non-linearities can be isolated and monitored by detecting changes in the noise power as a function of changing dispersion.

As shown in FIG. 4*a*, the present invention provides a variable dispersion unit (VDU) 60, which operates under control of a suitable dispersion control signal Vd to generate the test signal T(t) by imposing a selected amount of dispersion to the received data signal $D_{OUT}(t)$. The test signal T(t) is then supplied to an O/E converter 64, which generates a corresponding electrical test signal 66. The electrical test signal 66 is then supplied to a pair of detection circuits, namely: a flat signal detection circuit 68 which operates to detect a flat region of the electrical test signal 66, in the form of a string of successive bits of equal value; and a noise detector 70, which operates to detect a signal parameter indicative of noise. When a flat region is detected, a noise parameter value at or near the center of the flat region is sampled (or derived) and supplied to a signal processor 72.

The sampled parameter value can then be stored in a table 74, along with the dispersion control signal value Vd, which serves as an indicator of the dispersion imposed by the VDU 60. By progressively changing the dispersion control signal value Vd (e.g., periodically, or after each time a sampled parameter value is stored in the table 74), the signal processor 72 can accumulate data indicative of the relationship between the noise power and dispersion in the table 74. This data can then be analyzed to detect the effects of phase non-linearities within the link 6, as will described in greater detail below with reference to FIG. 5.

Figure 5:
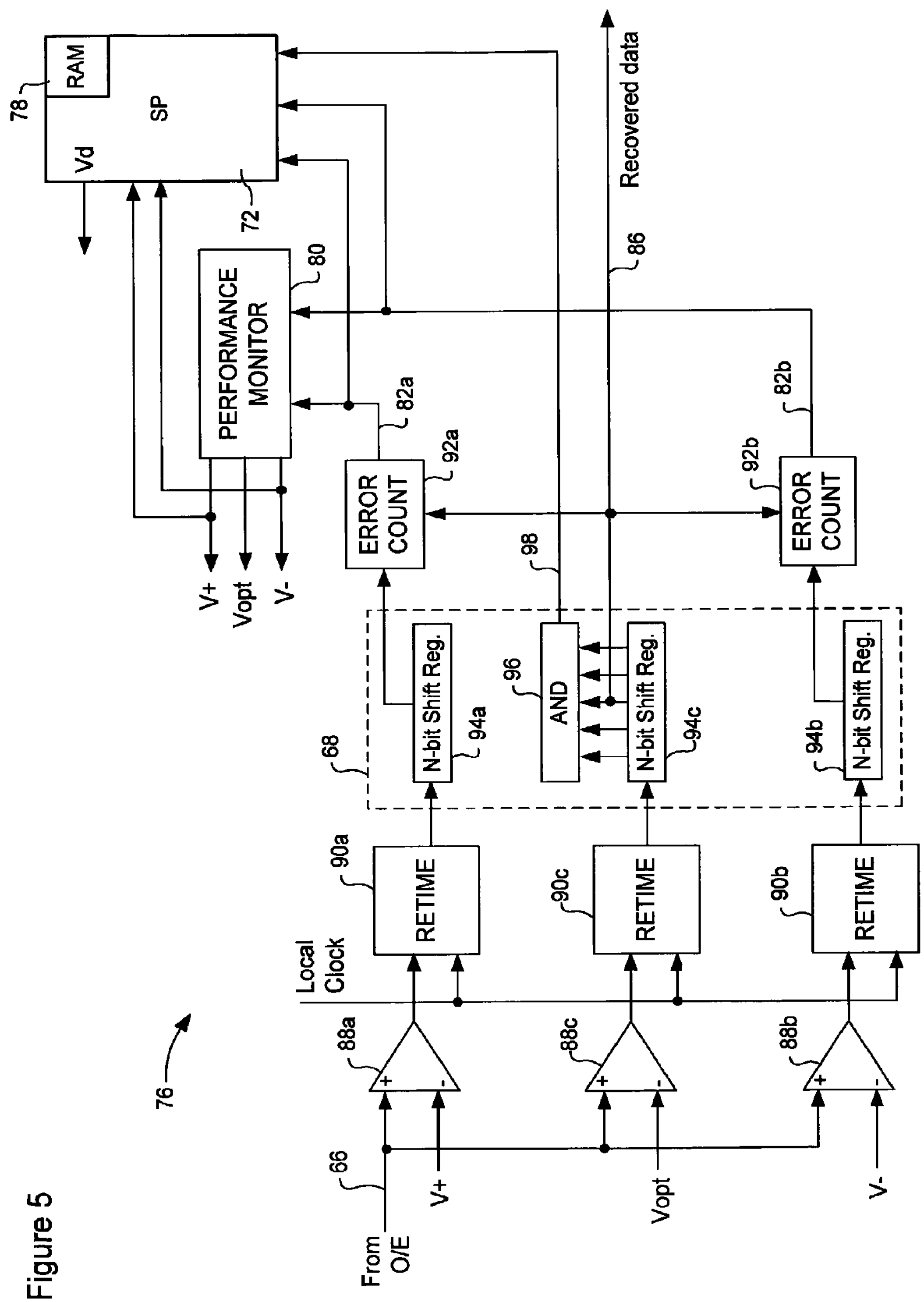
FIG. 5 is a block diagram schematically illustrating principal elements of a data regenerator for implementing the monitoring system of FIGS. 4*a*-*c*.

FIG. 5 is a block diagram schematically illustrating principal elements of a monitoring system 76 for implementing the monitoring method of FIGS. 4*a*-*c*. As shown in FIG. 5, the monitoring system comprises a data regenerator (known, for example, from U.S. Pat. No. 4,823,360) which has been modified to include the flat signal detection circuit 68, and the signal processor 72, which includes a Random Access Memory RAM 78 for storing noise and VDU data. The data regenerator is coupled downstream of the OLE converter 64, and includes a performance monitor 80 and a set of three parallel data paths, namely: a pair of errored paths which produce respective error signals 82 and 84; and an optimum path which produces a recovered data signal 86. Each of the data paths includes a threshold comparator 88 cascaded with a retiming circuit 90. In addition, the two errored paths include an error counting circuit 92 coupled to receive errored data from its respective retiming circuit 90, and recovered data 86 from the optimum path. Together, the error counting circuits 92 of the data regenerator provide the functionality of the noise detection circuit 70 of FIG. 4*a*. Outputs of the error counting circuits 92 are coupled to the performance monitoring circuit 80, which controls operation of the data regenerator. The flat signal detection circuit 68 is inserted into the (otherwise conventional) data regenerator, downstream of the retiming circuits 90, as shown in FIG. 5.

Various techniques may be used to implement the flat signal detection circuit 68. In the example of FIG. 5, the flat signal detection circuit 68 comprises an n-bit shift register 94 connected to the output of each retiming circuit. Within each of the errored data paths, the respective n-bit shift register 94*a,b* is coupled between the retiming circuit 90 and the error counting circuit 92, and acts as a delay line to maintain synchrony between signals in the three paths. In the optimum data path, an n-port AND-gate 96 is coupled to each bit of the n-bit shift register 94*c*, such that a binary "1" will appear at the AND-gate output 98 when at least n successive bits of the recovered data signal 96 have the same value. For example, when n successive binary "1"s of the recovered data signal 86 are latched into the n-bit shift register 94*c*, a binary "1" will appear at the AND-gate output 98, indicating that a flat region of at least n bits in length has been detected. As shown in FIG. 5, the AND-gate output 98 is coupled to an input of the signal processor 72, so that detection of a flat region can trigger calculation and storage of noise and VDU data by the signal processor 72.

As shown in FIG. 5, each of the n-bit shift registers 94 is tapped at a bit lying at or near the center of the shift register 94. For example, in FIG. 5, each shift register has a length of 5 bits, and is tapped at the center (i.e., the third) bit. This means that each error counting circuit 92 will operate on the basis of the data bit located at (or near) the center in the sequence of data bits currently stored in the shift register 94. In the case of a flat portion of the recovered data signal 86 latched into the shift register 94*c*, this means that the error counting circuits 92 will receive the center-bit of the flat portion substantially simultaneously with detection of the flat portion by the n-port AND-gate 96. Noise values calculated by the signal processor 72 at a timing of the detection signal from the n-port AND-gate 96, will therefore pertain to the center portion of the flat region.

The number (n) of bits in each shift register 94 is preferably selected based on the number of successive bits (of the received data signal 18) that are subject to inter-symbol interference. With this arrangement, the noise value calculated by the signal processor 72, again, at a timing of the detection signal from the n-port AND-gate 96, will be substantially free of noise due to inter-symbol interference.

In operation, the electrical test signal 66 generated by the O/E converter 64 is supplied to a non-inverting (+) input of each of the threshold comparators 88. The inverting (−) inputs of the threshold comparators 88 are connected to receive comparison or threshold levels V+, Vopt, and V− respectively from the performance monitor 80. Each threshold comparator 88 generates a binary signal which reflects the result of comparison between the electrical test signal and its respective threshold level. Threshold levels V+ and V− are respectively higher and lower than the optimum threshold level, Vopt, and produce comparison results containing more errors than Vopt. The binary signal generated by each threshold comparator 88 is retimed by a respective retiming circuit 90 using a local clock signal (which may, for example, be generated by a conventional clock recovery circuit—not shown in FIG. 5). Each retiming circuit 90 (which may be provided by a conventional D-type flip-flop circuit) generates a respective data signal. The data signals of the two errored paths are based on the errored binary signals derived from V+ and V−, and may therefore be referred to as errored data signals. The retimed binary signal derived from Vopt is an optimum solution that most nearly reflects the original data content of the received test signal, and is used as the recovered data signal 96.

Each of the errored data signals is latched through a respective n-bit shift register 94*a,b* of the flat signal detection circuit 68 and supplied to the respective error counting circuit 92, which also receives the recovered data signal 86. Each error counting circuit 92 generates an error signal 82 that is indicative of the difference between its errored data signal and the regenerated data signal 86. Typically, the error counting circuits 92 generate error signals which are proportional to the Bit Error Rate (BER), or, in some cases, the logarithm of the Bit Error Rate (logBER), of the respective errored data signal relative to the regenerated data signal. Taken together, the two error signals 82 provide an indication of the BER (or logBER) of the received test signal as a function of threshold voltage, as shown in FIG. 4*c*. This relationship is a direct indicator of noise in the test signal T(t). Accordingly, as shown in FIG. 5, the two error signals 82 and the threshold levels V+ and V− are tapped and supplied to the signal processor 72, which uses these values to calculate a noise parameter value indicative of the noise in the test signal T(t). The noise parameter value and the current dispersion unit control signal value Vd can then be saved in the RAM 78. As mentioned previously, by progressively changing the dispersion control signal value Vd (e.g., periodically, or after each save operation), the signal processor 72 can accumulate data indicative of the relationship between the noise and imposed dispersion. This data can then be analyzed to detect the effects of phase non-linearities within the link 6.

Figure 6:
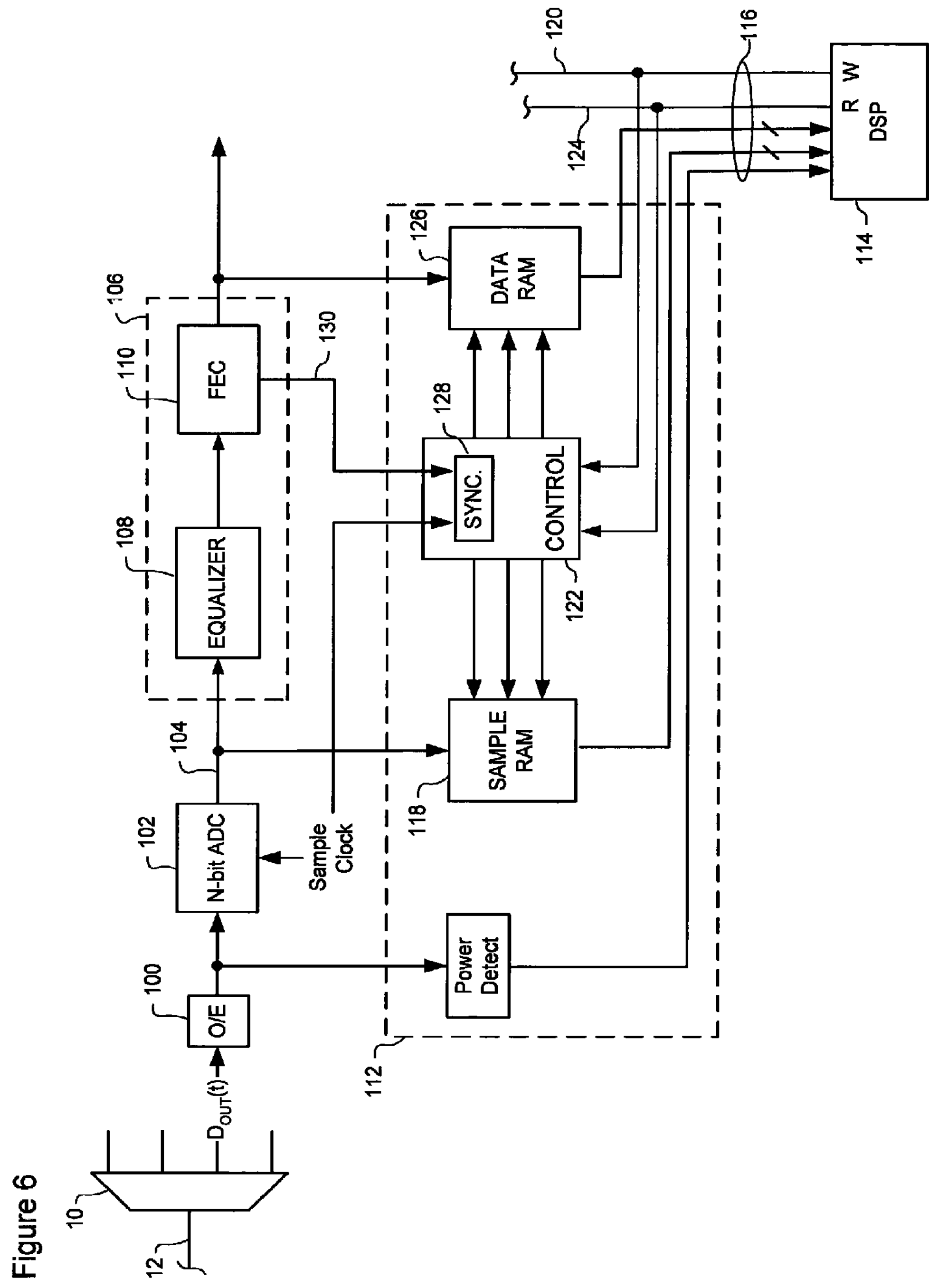
FIG. 6 is a block diagram schematically illustrating principal elements and operations of a monitoring system in accordance with a fourth embodiment of the present invention.

As described in Applicant's co-pending U.S. patent application Ser. No. 10/145,035, filed May 15, 2002, some optical networking equipment utilize high-speed Analog-to-Digital Converters (ADCs) to convert received data traffic into digital signals for data recovery and system management. The sample rate of these ADCs is preferably chosen to satisfy Nyquist's theorem for the received signal traffic, which means that the complete received signal waveform can be recovered from the digital data stream produced by the ADC. FIG. 6 illustrates a monitoring system in accordance with the present invention, which is usable in such networking equipment, and particularly suitable for isolating effects of XPM and SPM.

As shown in FIG. 6, each channel of the receiving node comprises an O/E converter 100 which converts the received data signal $D_{OUT}(t)$ into a corresponding electrical data signal. An m-bit ADC 102 (where m is preferably at least 2, and may be as high as 8 or more) samples the electrical data signal from the O/E converter 100, at a predetermined sample rate, and generates a corresponding digital signal 104 in the form of successive digital samples. The digital signal 104 is then supplied to a decoder circuit 106 for filtering and data recovery using, in the example of FIG. 6, conventional digital equalizer 108 and Forward Error Correction (FEC) 110 circuits. The phase non-linearity monitoring system includes a respective channel monitor 112 coupled to each channel, and a digital signal processor (DSP) 114 coupled to each channel monitor 112 via a data bus 116.

As shown in FIG. 6, each channel monitor 112 comprises a sample memory 118 (which may be provided as a conventional random access memory—RAM) for storing sample data in the form of a set of sequential digital samples of the digital signal 104. The sample data can then be passed to the DSP 114 for processing, as will be described in greater detail below. Thus the channel monitor 112 utilizes the ADC 102 which operates normally to detect the electrical data signal at a timing of the sample clock. As such, the sample data stored in the sample memory 118 will directly reflect the state of the received electrical data signal, and thus the performance of the respective optical channel.

In general, the sample memory 118 may be of any arbitrary size. Preferably, the sample memory 118 will be sized to store samples generated by the ADC 102 within a predetermined interval of time (such as, for example, in the range of a few tens of microseconds to milliseconds) and/or encompassing a predetermined number of samples, or a predetermined number of recovered data bits generated by the FEC circuit 110. Samples may be stored continuously, so that the sample memory 118 always contains the most recently generated samples. Preferably, however, the storage operation is controlled by a "write" signal 120 generated by the DSP. For example, the channel monitor 112 may be provided with a controller 122 which is responsive to the "write" signal 120 to flush the contents of the sample memory 118, and then store a predetermined number of successive samples generated by the ADC 102. This arrangement has the advantage that the DSP 114 can simultaneously control the storage of sample data in every channel monitor 112 of a multi-channel system. By properly accounting for propagation delay of the "write" signal 120 between the DSP 114 and each of the channel monitors 112, it is possible to ensure that the storage operation is executed substantially simultaneously across all of the channels of the optical communications system 2. As a result, the sample data stored by all of the channel monitors 112 will accurately represent a "snap shot" of the state of the optical communications system 2 during the involved time interval.

As may be appreciated, the simultaneous storage of sample data across all of the channels of the optical communications system 2 facilitates correlation of sample data from each channel monitor 112, and thus highly accurate analysis of cross-channel effects such as, for example, cross phase modulation (XPM). In particular, the system of FIG. 6 is capable of implementing the method described above with reference to FIGS. 2 and 3. Thus, a probe signal p(t) can be transmitted (and received) though channel-A, while a data signal 18 is transmitted through channel-N and received as a test signal 20. In response to the "write" signal from the DSP 114, the respective channel monitors 112 will store sample data representing the received probe and test signals p(t) and T(t). Because the sample rates of the respective ADC's 102 satisfy Nyquist's theorem, complete reconstruction of the sampled signals is possible, allowing the DSP 114 to perform highly accurate correlation between the probe signal 16 and distortions in the received test signal 20.

In general, at least some differences in the timing of the storage operation within each channel monitor 112 must be expected. That is, precise simultaneity across all of the channel monitors 112 will not be achieved. However, provided that there is at least some overlap in the timing of the storage operation, then sample data from different channel monitors 112 can be correlated (at least to the extent that the degree of overlap permits) and cross-channel effects analyzed. The minimum tolerable degree of overlap will generally depend on the minimum amount of signal correlation required to analyze a desired cross-channel effect.

The transfer of sample data to the digital signal processor (DSP) 114 can conveniently be controlled by a "read" signal 124 generated by the DSP 114. This arrangement enables respective sample data from each of multiple channel monitors 112 to be transferred to the DSP 114 for further analysis. Synchronized storage of sample data within the sample memory 118 of each channel monitor 112 allows indexing of the samples so that the transfer of sample data to the DSP 114 does not need to be real-time. Because each channel monitor 112 stores samples representing a substantially simultaneous time intervals across all channels of the optical communications system 2, information can be transferred from each channel monitor 112, in turn, without loss of correlation between samples stored by different channel monitors 112.

As may be appreciated, the accuracy with which the DSP 114 can calculate performance parameters of the communications system 2 is dependent on the degree to which the sample data stored by each channel monitor 112 reflects its respective electrical channel signal. This, in turn, will be dependent on the resolution of the ADC 102, and the sample frequency $F_S$ of the sample clock. Clearly, increasing the resolution of the ADC 102 (e.g., using an 8-bit ADC as opposed to a 2- or 4-bit ADC) increases precision of each sample. However, this increased precision is obtained at a cost of increased expense and complexity.

As shown in FIG. 6, the channel monitor 112 also includes a data memory 126 (which may also be provided as a conventional RAM) for storing sequential bits of the recovered digital data stream generated by the decoder circuit 106. The storage of both sample data and recovered digital data enables an increased range of signal analysis to be performed by the DSP 114, including detection of self-phase modulation (SPM), as will be described below.

The sample memory 118 is coupled to the ADC 102 as described above in order to store successive samples generated by the ADC 102. Similarly, the data memory 126 is coupled to the output of the FEC circuit 110 in order to store successive data bits of the recovered digital data stream. Because the physical characteristics of the ADC 102 and the decoder circuit 106 are well characterized, it is possible to control the storage operations such that each data bit saved in the data memory 126 is properly associated with corresponding digital samples stored in the sample memory 118. In the illustrated embodiment, this functionality is implemented by means of a synchronization circuit 128 which operates on the basis of a trigger signal 130 generated by the FEC circuit 110 (and indicative of the timing of each corrected bit generated by the FEC circuit 110), in combination with the known propagation delay between the ADC 102 and the output of the FEC circuit 110.

As will be appreciated, the storage of (correlated) sample data and corrected bits within each channel of the optical communications system 2 allows the DSP 114 to analyze the received signal wave form (as represented by the sample data) in direct relation to the corresponding data extracted from that wave-form.

As is known in the art, the effects of SPM vary with both dispersion and the transmission power level of an optical signal. These effects are generally well characterized for the special case of an isolated pulse. Accordingly, for the purposes of detecting the effects of self-phase modulation (SPM), the stored corrected bits are analyzed to locate a "test signal" in the form of an isolated pulse. For the purposes of this analysis, such an isolated pulse may, for example, take the form of one or more successive binary "1"s preceded and followed by a sufficient number of successive binary "0"s to avoid variations due to inter-symbol interference. Isolated pulses of this type may occur "naturally" within the data signal D(t) with sufficient regularity to enable SPM monitoring. If desired, however, the test signal may also be inserted into the data signal D(t) at regular intervals. For example, a predetermined bit sequence containing an isolated pulse may be inserted into the "training sequence" bits that are reserved as part of the standard transmission format. Once the test signal (isolated pulse) has been detected, the corresponding sample data can be analyzed to evaluate the associated signal waveform. Changes in the waveform shape with variations in either dispersion, or the transmission power level of the data signal D(t) from the sending node **4*a* provides a direct indication of the magnitude of SPM in the link 6**.

An alternative approach utilizes the fact that inter-symbol interference (ISI) can be described as being comprised of linear and non-linear ISI components. While both of these components are first-order dispersion effects, the linear ISI component primarily results from dispersion, filtering etc.; while the non-linear ISI component results, predominantly, from SPM-induced chirp. Accordingly, SPM can be evaluated by detecting the non-linear ISI component within a "test signal" in the form of the received data signal $D_{OUT}(t)$. As is known in the art, digital equalizers 108 of sufficiently high performance (in terms of comprehensive equalization and line rate) will automatically detect non-linear ISI. Accordingly, in embodiments in which the decoder circuit 106 includes a sufficiently comprehensive digital equalizer 108, it is possible to obtain a direct measure of non-linear ISI by tapping the digital equalizer 108.

In the embodiment of FIG. 6, detection of the non-linear ISI can also be accomplished by the DSP 114. In this case, the channel monitor operates to store temporally-correlated sample data and recovered data bits, which can then be transmitted to the DSP 114, as described above. Thus, the sample data contains sufficient information to enable compete reconstruction of the received data signal $D_{OUT}(t)$ waveform corresponding to the stored data bits. This enables the DSP 114 to process the sample data, using known linear equalization techniques, to remove effects of linear ISI. Similarly, known digital signal processing techniques can be used to process the sample data to remove effects of dispersion and polarization. Because, the DSP 114 operates "off-line" (that is, out of the path of live data traffic), an inability of the DSP 114 to complete these processing steps in real-time is of no consequence.

Following the above digital signal processing steps (i.e. removal of linear ISI, dispersion and polarization effects), any remaining ISI within the processed sample data will be the non-linear ISI component. This can be evaluated by comparison between the (processed) sample data and the corresponding recovered data bits, and provides a direct indication of SPM.

The embodiment(s) of the invention described above is(are) intended to be exemplary only. The scope of the invention is therefore intended to be limited solely by the scope of the appended claims.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of monitoring phase nonlinearities of an optical communications system, the method comprising steps of:

generating a test signal using a data signal transmitted through at least a portion of the optical communications system and received at a selected monitoring point of the optical communications system, the test signal comprising the received data signal and including a predetermined property that is uniquely associated with at least one phase nonlinearity of the optical communications system; and detecting the predetermined property of the test signal at the selected monitoring point;

generating the test signal comprising:

receiving the data signal through a wavelength channel of the optical communications system, the data signal including a plurality of flat regions, each flat region having at least a predetermined minimum length; and varying dispersion of the wavelength channel; and the predetermined property comprising a variation in a noise metric of the received data signal that correlates with a change in the dispersion of the wavelength channel.

2. A method as claimed in claim 1, wherein the data signal comprises live data traffic of the optical communications system.

3. A method as claimed in claim 1, wherein each flat region comprises a plurality of successive bits of equal value.

4. A method as claimed in claim 3, wherein the predetermined minimum length of each flat region is selected to substantially avoid inter-symbol interference within the respective flat region.

5. A method as claimed in claim 4, wherein the predetermined minimum length of each flat region is at least three bits.

6. A method as claimed in claim 1, wherein the step of varying dispersion of the wavelength channel comprises a step of successively imposing each one of a set of predetermined dispersion values on the wavelength channel.

7. A method as claimed in claim 6, wherein the step of detecting the predetermined property of the test signal comprises, for each imposed dispersion value, steps of:

detecting a flat region within the received data signal;

measuring the noise metric of the received data signal, at a timing of a center portion of the detected flat region; and storing the measured noise metric value in association with the imposed dispersion value.

8. A method as claimed in claim 7, wherein the step of measuring the noise metric comprises a step of measuring any one or more of:

a bit error rate;

a signal-to-noise ratio; and an eye-opening ratio.

9. An apparatus for monitoring phase nonlinearities of an optical communications system, the apparatus comprising:

a receiver configured to receive a data signal through a wavelength channel of the optical communications system, the data signal comprising a plurality of flat regions, each flat region having at least a predetermined minimum length;

a channel monitor configured to generate a test signal comprising the received data signal and including a predetermined property that is uniquely associated with at least one phase nonlinearity of the optical communications system, the channel monitor comprising:

a variable dispersion unit configured to vary dispersion of the wavelength channel;

a flat region detector configured to detect a flat region of the received data signal;

a noise detector configured to detect a noise metric of the received data signal; and a Signal Processor configured to detect the predetermined property of the test signal, the predetermined property comprising a variation in the noise metric of the received data signal that correlates with a change in the dispersion of the wavelength channel.

* * * * *